(12) United States Patent
Orton (10) Patent No.: US 6,590,674 B1
(45) Date of Patent: Jul. 8, 2003

(54) METHOD AND APPARATUS FOR CREATING AND MAINTAINING GRAPHIC REPRESENTATIONS OF DOCUMENTS UNDER A UNIVERSAL FORMAT

(75) Inventor: David A. Orton, Santa Cruz, CA (US)

(73) Assignee: Agile Software, San Jose, CA (US)

( * ) Notice: Subject to any disclaimer, the term of this patent is extended or adjusted under 35 U.S.C. 154(b) by 0 days.

(21) Appl. No.: 09/401,711

(22) Filed: Sep. 23, 1999

(51) Int. Cl.[7] .............................................. G06F 15/00
(52) U.S. Cl. ...................... 358/1.18; 358/403; 707/513; 707/522; 707/523
(58) Field of Search ............................. 358/1.11, 1.13, 358/1.15, 1.16, 1.17, 1.18, 403–448, 452; 707/513–517, 522–524, 530

(56) References Cited

U.S. PATENT DOCUMENTS 5,659,742 A    8/1997  Beattie et al.
5,675,788 A   10/1997  Husick et al.
5,940,843 A    8/1999  Zucknovich et al.
6,247,133 B1 * 6/2001  Palage et al. ............... 713/201

OTHER PUBLICATIONS

International Search Report Transmittal for PCT/US00/40977.

* cited by examiner

*Primary Examiner*—Mark Wallerson
(74) *Attorney, Agent, or Firm*—David R. Stevens (57) ABSTRACT

A document management system for use in a computer system that affords convenient access to documents configured under incompatible formats. The invention allows the graphical depictions of documents configured under a universal format to be stored and maintained in a viewer server that can be accessed by a user on the system. This is accomplished by using a viewer server to extract a graphical image of a document while performing a print operation and storing the image in a separate viewer file. The system can therefore maintain files of a document under its original format and in a separate file under a universal format.

15 Claims, 6 Drawing Sheets

METHOD AND APPARATUS FOR CREATING AND MAINTAINING GRAPHIC REPRESENTATIONS OF DOCUMENTS UNDER A UNIVERSAL FORMAT

FIELD OF THE INVENTION

The invention generally relates to a document management system and, more particularly, to a system for automatically creating and maintaining graphical depictions of documents under a universal format for convenient viewing and marking by a user.

BACKGROUND

Most computer systems include document management systems for organizing and controlling computer files containing document information. This document information is stored in a computer's memory according to a particular format when the document is originally created. In order to access a document, application software is required for opening the file to retrieve the document to be viewed and otherwise utilized by a user's computer. This typically must be done for each individual document. Once accessed, the document can be interactively viewed, printed and revised by a user. Different documents can be created under a large variety of formats including word processing formats for text documents, complex drawing formats for drawings such as computer aided designs (CAD) and other formats. In order to view various documents, a computer system needs to have application software that is separately developed for each type of document, often by various companies. Currently, in order for a computer to be versatile and able to open documents created under different formats, the computer must store the application software in its memory.

One conventional approach is to convert documents by implementing software algorithms to directly parse out and understand each file format under which the document was created. The resulting document can then be accessed for viewing, revising, and other functions. One problem with developing the algorithms is that many formats are difficult to access and would therefore require extensive code to interpret the individual documents. For example, many formats are proprietary to the originating application manufacturer. As a result, the algorithm designer is left to reverse engineer the details of the file contents, which is an error prone and time consuming task. To further complicate the problem, typical application file formats may undergo numerous version changes that must be taken into account by the algorithm designer. This makes the approach very labor intensive.

Also, graphics files, for example, can require two dimensional and three dimensional CAD applications, which generate complex file formats. The software code required to interpret the files would thus be voluminous and complex. To further complicate matters, data contained in the computer files are often ambiguous and ill-defined and are also uniquely interpreted by the originating application. Thus, they are difficult to duplicate. As a result, developing a program to automatically convert documents into a universal format is a difficult task.

A second approach requires a user to manually perform a conversion of every document into a neutral file format when the document is entered into the system. The documents can then be accessed by the user with a single program. This manual conversion approach, however, requires all users that enter documents into the system to have the necessary file's application conversion software stored on the computer system. Moreover, the user needs to know how to use the conversion software properly. Furthermore, the conversion software used by the user may introduce objectionable or incorrect results if direct parsing and understanding of the file format is required. For example, if all documents are converted to a neutral file format for bit mapped images, the quality of the document will be greatly limited, especially if enlarged or reduced scales of the document are required. Accounting for quality in scaled applications can be accomplished; however, this may result in larger files when the documents are stored in the neutral file format, even in simple documents.

Therefore, there exists a need for a system that provides convenient access to documents that does not require each user to have every software application needed to access the documents that are configured under different formats. As will be seen below, the invention accomplishes this in a simple and elegant manner.

SUMMARY OF THE INVENTION

The invention provides a document management system for use in a computer system that affords convenient access to documents configured under incompatible formats. The invention allows the graphical depictions of documents under a universal format to be stored and maintained in a viewer server that can be accessed by a user on the system. This is accomplished by using a viewer server to extract a graphical image of a document while performing a print operation of a document and storing it in a separate viewer file. The system can therefore maintain files of a document under its original format and under a universal format.

The invention can be incorporated in a host processor configured to communicate with a network, where the processor contains a multitude of software applications needed to access document files configured under various formats. The original document files are managed by a file server that is accessible by the host processor and is us used by the processor to open the document files using the proper software application. A viewer server communicates with the network to generate a universal, application-neutral viewer format for configuring the original documents thereunder. This viewer format may be any arrangement of data bits that defines character information pertaining to the document, for example, vectors, angles, bitmaps of figures, etc.

The viewer server can communicate with the file server to access the original versions of the documents. The viewer server also communicates with a viewer print driver that is configured to initiate a print operation of the original document using a software application configured to access the original document according to its original format. The print driver does not necessarily print the document to a printer, but rather initiates the print operation to extract a graphical representation of the document from the data generated during the print operation. The viewer server further communicates with a viewer print monitor that is configured to monitor the print operation initiated by the viewer print driver and to respond to any user interface requests that may be generated during the printing operation. Document files containing the graphic representation are then stored in a viewer storage device that is accessible by both the viewer server and the file server, without the need for the application specific software. The resulting viewer documents can then be accessed by the host processor or any other user on the network and can be viewed and marked up by a drawing program.

DETAILED DESCRIPTION OF PREFERRED EMBODIMENTS

The invention is directed to a system for automatically creating and maintaining graphical depictions of documents under a universal format to afford convenient viewing and marking of the documents by a user. Unlike the prior art, the invention accomplishes this without the need for individual software applications for each format under which a particular document may be configured. The invention is particularly adapted to systems running multiple software applications and having multiple user interfaces connected to a network and will be described in that context. It will be appreciated, however, that this is illustrative of only one utility of the invention, and that the invention has greater applicability.

Figure 1:
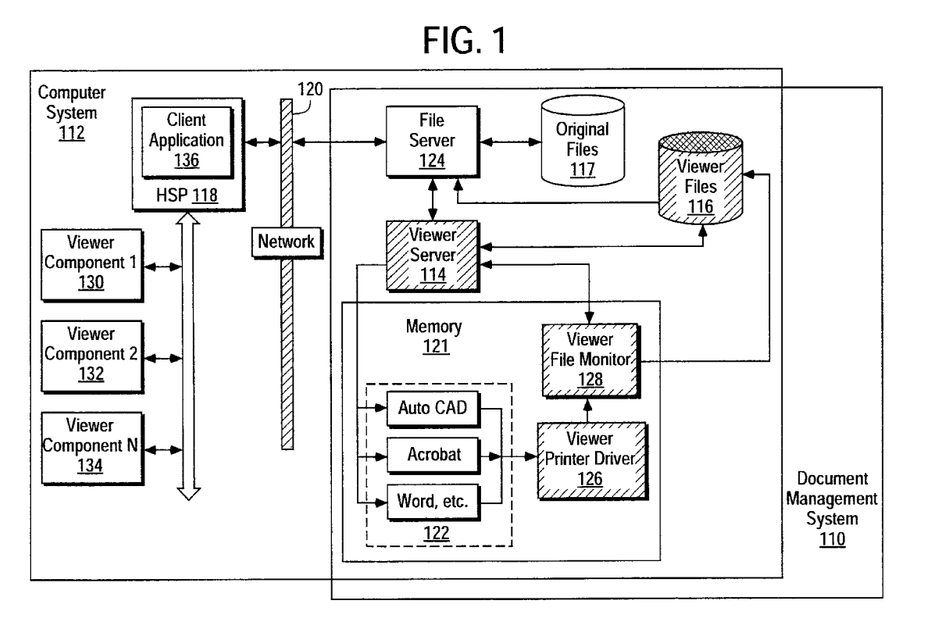
FIG. 1 is a block diagram of a document management system according to the invention.

Referring to FIG. 1, the invention provides a document management system 110 for use in a computer system 112. The computer system affords convenient access to documents configured under formats, which may be incompatible, by automatically reformatting the documents into a universal format and storing the resulting document in a viewer server 114. This newly formatted document allows a user to view and mark-up the document without the need for an application software program required for each individual originally formatted document. The document management system 110 maintains graphical depictions of documents under a universal format in a viewer server 114 that can be accessed by a user on the system 112. This is accomplished by using the viewer server 114 to extract a graphical depiction of a document while performing a print operation of a document and storing it in a separate viewer file in viewer file database 116. The system 112 can therefore maintain files of a document under its original format in original document database 117 and under a universal format in viewer file database 116. Now, a number of viewer stations can access viewer files to view graphic depictions of the files for review, mark up and modification without the need for application software for each individual format under which a document could be formatted.

Utilizing one embodiment of the invention, a host signal processor (HSP) 118 is configured to communicate with a network 120 and has access to the document management system 110. The management system includes memory 121 that contains a multitude of software applications 122 needed to access document files. The memory can be a random access memory (RAM), dynamic read only memory (DRAM), static read only memory (SRAM) and other types of memory devices that are capable of storing digital data.

The software applications 122 allow access to documents that may be configured under various incompatible formats. The original document files are managed by a file server 124 that is accessible by the host processor 118 to open the document files using the proper software application. The viewer server 114 communicates with the network 120 via the file server 124 and is configured to generate a universal, application-neutral viewer format in which to configure the original documents.

The viewer server 114 can communicate with the file server 124 to access the original versions of the documents from database 117. The viewer server also communicates with a viewer printer driver 126, stored in memory 121, that is configured to initiate a print operation of the original document using one of the native software applications 122. Applications 122 are configured to access the original document according to its original format. Each document has a native application program that may be stored in memory 121 for execution by either the file server or the viewer server.

The printer driver 126 does not necessarily print the document to a printer, but rather initiates the print operation to extract a graphic representation of the document from data generated during an application's print operation. The viewer server 114 further communicates with a viewer file monitor 128 that is configured to monitor the print operation initiated by the viewer printer driver 126 and to respond to any user interface requests that may be generated during the printing operation. Document files containing the graphic representation are then stored in the viewer files database 116 that is accessible by both the viewer server 114 and the file server 124.

The resulting viewer documents can then be accessed by the host processor 118 or any other user at viewer stations 130, 132, 134 connected to the network 120 via HSP 118 according to client application software 136. The viewer stations may be one of many types of computer work stations such as a general purpose personal computer, as discussed below and illustrated in FIG. 5, or a special purpose processor that is dedicated solely to viewing documents from viewer server 116. The viewer stations may each have a central processing unit (CPU), a memory for storing files and software applications and a communications link to connect the viewer stations 130–134 to network 120. The viewer documents can also be viewed and marked up by a drawing program application such as MacDraw™ or another similar graphical overlay drawing program that can be loaded and stored in a memory device in one of the viewer stations.

Still referring to FIG. 1, the document management system 110 may use the printing function of the original software application of the document to parse out and understand the file formats required for the management system to process the files. The invention does not require the development of algorithms to process the files which are received in the system under different formats. The files may be automatically processed by viewer server 114 utilizing the original application's print capability, capturing data from the print process. No user intervention is required to store the document in a viewer file in viewer file database 116. Therefore, a user located at one of the viewer stations 130–134 can access the document for viewing and marking without the need of any conversion software or any original application software to access the document. This is done by initiating a print operation using the original application software and capturing the data that normally would be sent to a printer in a separate viewer file in viewer file database 116.

The invention utilizes a viewer printer driver 126 to initiate the print operation to expose the data to be captured and reformatted in a viewer file. A printer driver is a software component that converts graphical data defined by an application into a device specific block of data bytes which can be interpreted by a printer or similar hardware to create the printed image. Furthermore, printer driver software has its precise functions defined by the host operating system. Thus, applications can print without any knowledge of the details of the specific printer hardware. The host operating system, such as Windows NT, can be configured to allow the block of device specific data bytes to be directed to a file rather than to the print hardware. The invention utilizes this capability to capture the print image into a file, rather than sending it to a printer.

The software applications that define components of the invention such as the viewer printer driver 126 and file monitor 128 can be implemented using methods well known to those skilled in the art. These and other applications can be developed according to the invention using computer software code. This code is capable of being executed by a CPU to control the functions as prescribed by the software applications. Although the file server and the viewer server are shown separately in FIG. 1, they can be configured to function either together as a single computer system having a single CPU or apart as separate computing systems that perform separate functions with respect to the applications developed in accordance with the invention. The configuration of the servers illustrated in FIG. 1 is intended as an embodiment of the invention and is not intended to limit the claims in any manner.

According to the invention, once a print operation is initiated, the print operation within one of the application software programs 122 may be executed by the viewer server 114. This causes a stream of data bits to be sent to printer driver 126 to be printed. Software in the viewer server chooses the viewer printer driver 126 instead of a conventional printer. The data is then handled by the printer driver 126 to store the data into a viewer file data storage 116. Like most print operations, the application software will cause certain message windows to appear that request a user's response. The invention includes software executed by the viewer file monitor 128 to respond to these requests. The viewer file monitor 128 operates under control of the viewer server 114 to remain apprised of the beginning and end of print operations.

The stream of data bits sent to the viewer printer driver 126 contains data that maintains the character of the print information including vectors, drawing characters and image data such as a bitmap of figures, angles, colors, graphic data, text strings, lines, polygons and other similar characteristics. Just like information intended for a printer, the information emerges from the print operation in a somewhat unorganized, piecemeal fashion. This information may then be reorganized into a common format as it comes out and is stored in a viewer data file. The stored data includes information organized into pixel information and relationship data. The data can then be retrieved and viewed by a user at a viewer component terminal 130–134 (FIG. 1).

It is important to note that the print format is independent from the application specific print operation. This is apparent, for example, when there are multiple layers of objects displayed in an application. One example is a computer aided design drawing that illustrates product parts and text that overlay each other when viewing the document on the screen. When printed, only the visible objects appear, not the underlying objects or portions of objects. The invention is directed to storing the visible objects in a viewer file, requiring only the high level information to be displayed. The information captured in the print operation is only that which would appear in two dimensions according to the particular view selected. In many applications, this is all a person viewing the file needs. For example, in a production environment, a line worker may only need to view a part to be produced and see its assembly illustrated. In this example, only a two dimensional view is needed. This streamlines the data down to its basic character elements that are visible to the user.

The result is a simplified file that contains a two dimensional view of the document that can be viewed by a user. Furthermore, a user can utilize the invention to view documents extracted from a wide array of files that are configured under different and incompatible formats. Moreover, the user can view these files without the need to store each application specific software program.

The invention allows for the use of arbitrary printer drivers, such as Postscript™, Hewlett-Packard PCL™ printer drivers or other drivers, but there are significant advantages to the creation of a printer driver to be used specifically for the generation of a universal file format. This specifically designed printer driver can convert the graphical data generated by the software application into a block of data bytes, which defines the universal file. The printer driver then optimizes the data, while balancing among several characteristics. For example, it would be useful for the printed representation to be sealed without losing detail or introducing unwanted artifacts. It would also help for the universal file size to be as small as possible. It would be further useful for the universal file contents to be easily transferred by and interpreted by client software applications that display the file contents and that allow mark-ups and annotations on the display. It is also important that the file be a highly accurate representation of the graphical data, i.e., correct colors, line styles and widths, text fonts, etc.

A printer driver according to the invention can accomplish these goals in several ways. One way is to retain high level descriptions of the graphical data rather than transforming the data into lower level primitives as in conventional methods. For example, text characters can be retained as the actual character and position rather than being transformed into bitmap arrays. This prevents a loss of clarity in the character that may occur in a when using a bitmap image. Another useful method is to keep coordinate data at a high resolution to avoid it being wrongly displaced when it is magnified to produce the character. To help the software application more easily transfer characters, custom fonts defined by the application can be retained and transmitted in the universal file. To reduce the size of the files and number of data transfers, duplicate uses of common data, such as bitmap images, can be detected as bitmap images and stored only once for repetitive use. Furthermore, to help the user software application more easily interpret documents, the universal file can be post processed at the user end to add information at the beginning of the file, such as total page count or the horizontal and vertical extents of the drawn area on each page. Still further, in order for the final display to be clean and accurate, data such as sequences of coordinates can be transformed to enhance a final post processing file compression.

The document stored in the viewer file is preferably a graphical representation of the original document. The format of the file, the universal format in which the viewer files are configured, could be any one of standard graphics formats used for storing graphics files. Examples include a graphics interchange format (GIF) and a tagged image file format (TIFF), both of which are well known to those skilled in the art. Thus, it cannot be edited in the same manner that a user could edit the document using the original application software. However, using a drawing program much like many common drawing programs, a user can delete figures, markup figures, create banners, create identification indicators such as number tags, and perform numerous other markup functions on a document. Many different commercially available drawing programs well known to those skilled in the art may be used for this purpose.

Figure 2:
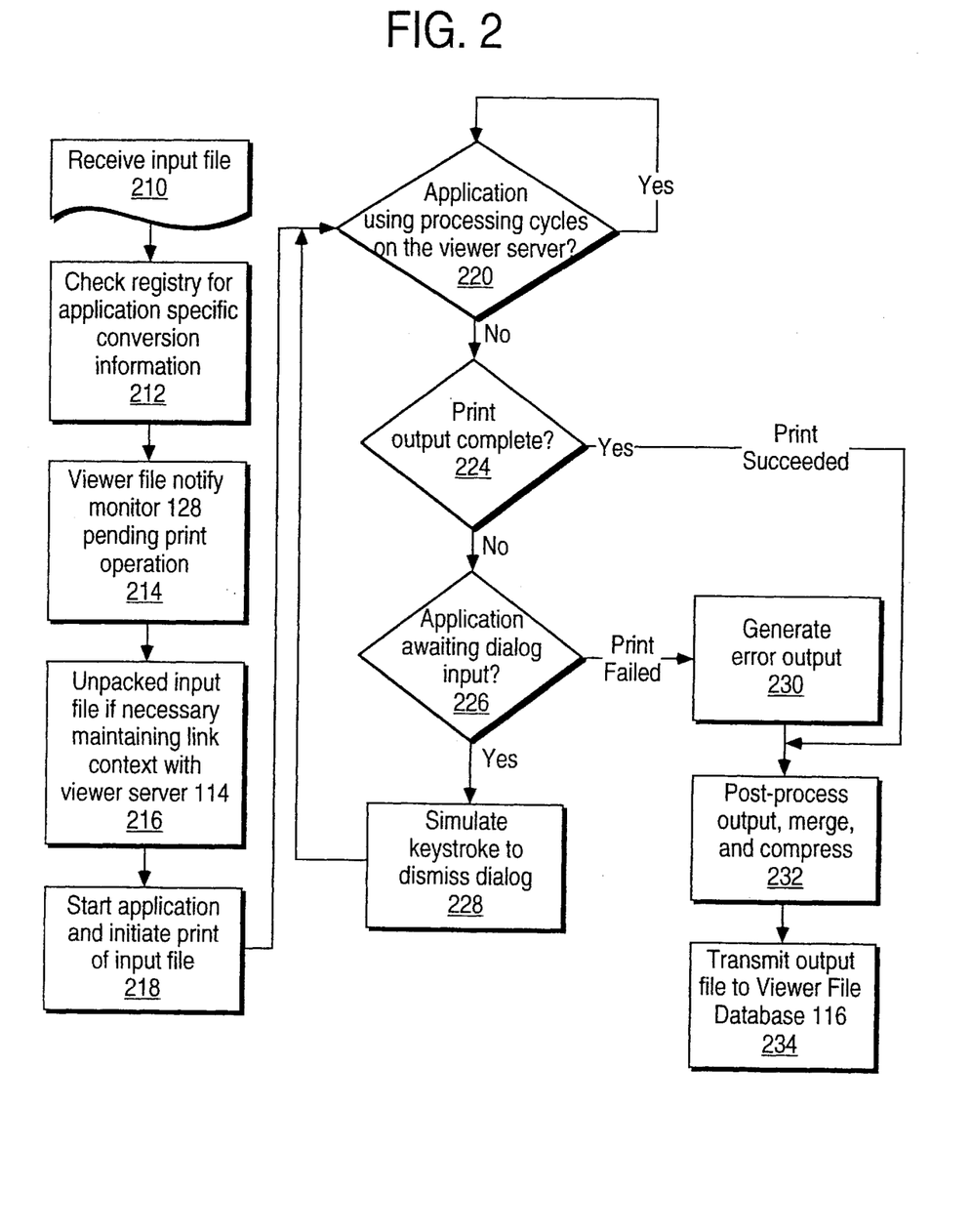
FIG. 2 is an operational flow diagram illustrating the function of a document management system according to the invention.

Referring to FIG. 2, the operation of the document management system 110, FIG. 1, will be described. In the first step 210, an input file containing an original document is received by the viewer server 114 from file server 124 for conversion into a universal format. In a next step 212, a registry in the file server is accessed by the viewer server to check for application specific conversion information, such as AutoCAD, Acrobat, or Word, located in software applications 122. Once the application software pertaining to the input file is located, it is executed to access the document stored in the file. In a next step 214, viewer file monitor 128 is notified by the viewer server that a print operation for the document management system 110 is pending. In a next step 218, the application software is run and the print operation of the input file is initiated by the viewer server 114 by sending a start command to the printer driver 126. In step 220, the operations of the document management system 110 are delayed until the application software is finished processing, tying up the HSP 118. Once step 220 is completed, the viewer file monitor 128 determines whether the print output operation has been completed. If it has not completed, the next query is whether the application software is waiting for any dialog input.

In most manual file conversions or print operations, dialog windows pop up on the screen instructing the user to initiate the next step of the file conversion or print operation. According to the invention, the document management system 110 automatically responds to these queries, avoiding any user intervention in the process. If a dialog window arises, the system in step 228 simulates a keystroke to respond to the dialog box, allowing operations to continue. The process then returns to step 220 to determine whether the software application is using HSP 118 time. If it is not, the system again proceeds to step 224 to determine whether the print output has been completed. If the print output is completed, the system proceeds to step 232 and performs post print process output, merge and compress operations so that the file can be stored in a viewer file in the viewer file database 116. Once those operations are completed, the operations proceed to step 234 to transmit the output file to the viewer file database 116.

Referring back to step 224, again, if the print output is not completed, the system proceeds to step 226 to determine whether the software application is awaiting dialog input. If, at this point, the print operation fails, the system proceeds to step 230 to generate an error output which eventually proceeds to the viewer file. The user can then determine the next step to converting the document.

Figure 3:
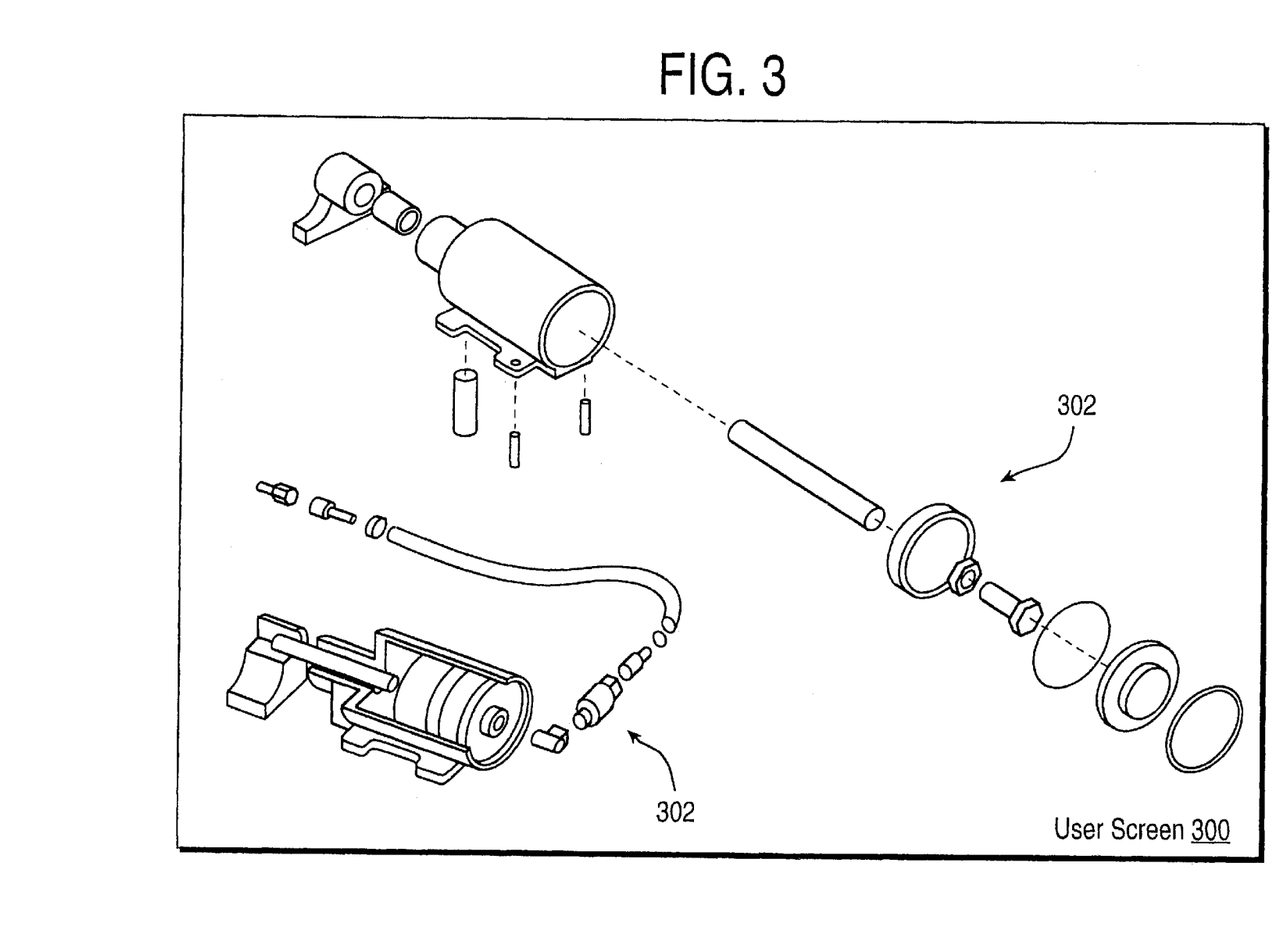
FIG. 3 is an example of a window displaying a CAD drawing that could be produced by a system utilizing the invention.

Since the file contains information retrieved by the print operation, a user can pull up figures from the file and mark them up. A CAD drawing, as for example shown in FIGS. 3 and 4, can be modified and marked up. User screen 300 which may be associated with a viewer component 130–134, permits a user to display a representation of parts 302 for purposes of production or design, for example. Referring to FIG. 3, a drawing of a mechanical device is shown as it would appear to a user on a user screen 300. This is a typical two-dimensional rendering of a device as it would appear in a CAD drawing for use in industry. According to the invention, this rendering would be stored as a two-dimensional drawing in one of the viewer files 116.

Figure 4:
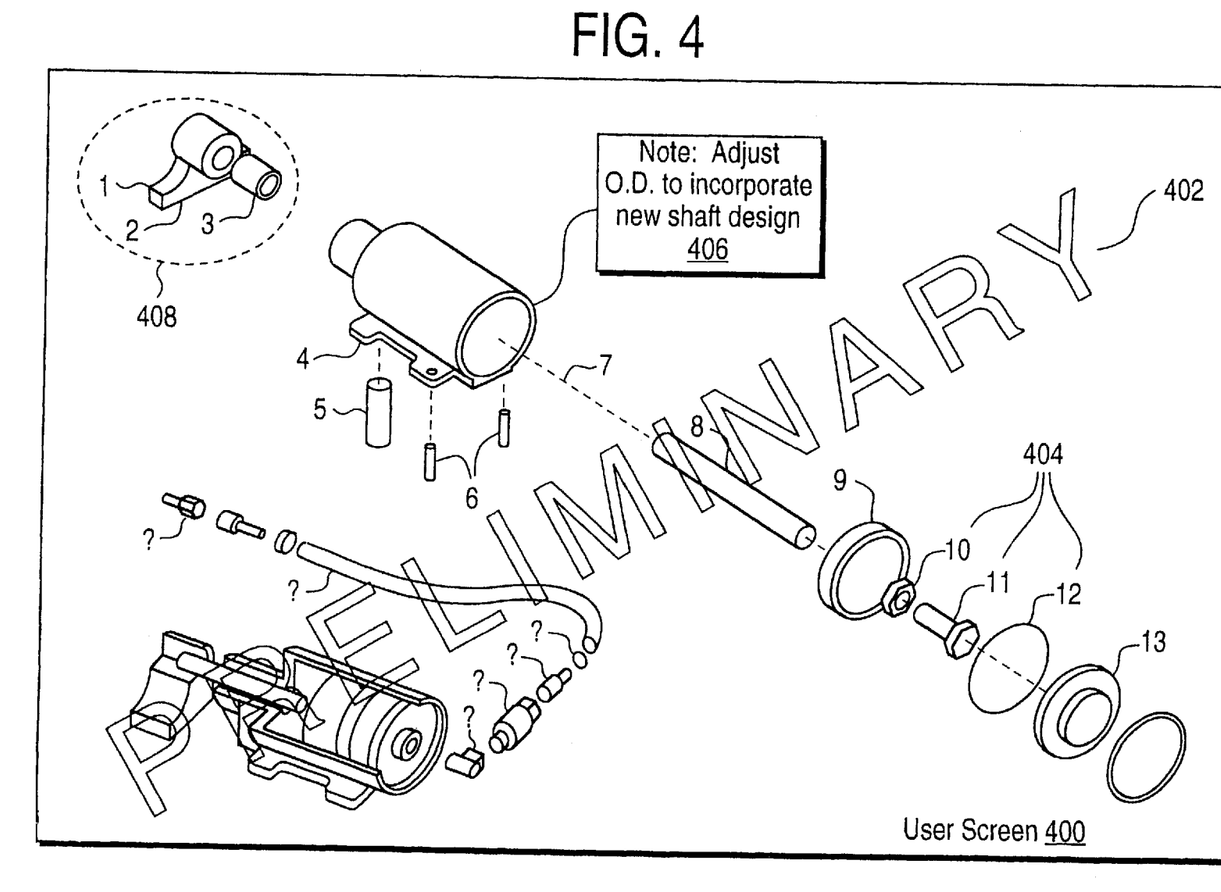
FIG. 4 is the window display of FIG. 3 shown marked up and modified by a user utilizing the invention.

FIG. 4 illustrates, the drawing of FIG. 3 shown marked up by the user. User screen 400 includes the same component parts as in FIG. 3 and is now labeled with a "PRELIMINARY" banner 402 to indicate it is a marked up or preliminary draft. Additionally, part indicator numbers 404 have been added. The file now further includes a note box 406 to note updates to the components. Since the drawing is rendered from the print information as discussed above, parts can also be moved around, such as components parts group 408, which has been moved relative to the other parts. Also, "?" marks have been added to indicate the need for labels. Many other labels can be used to mark up the drawings, including color shading and even erasing.

Figure 5:
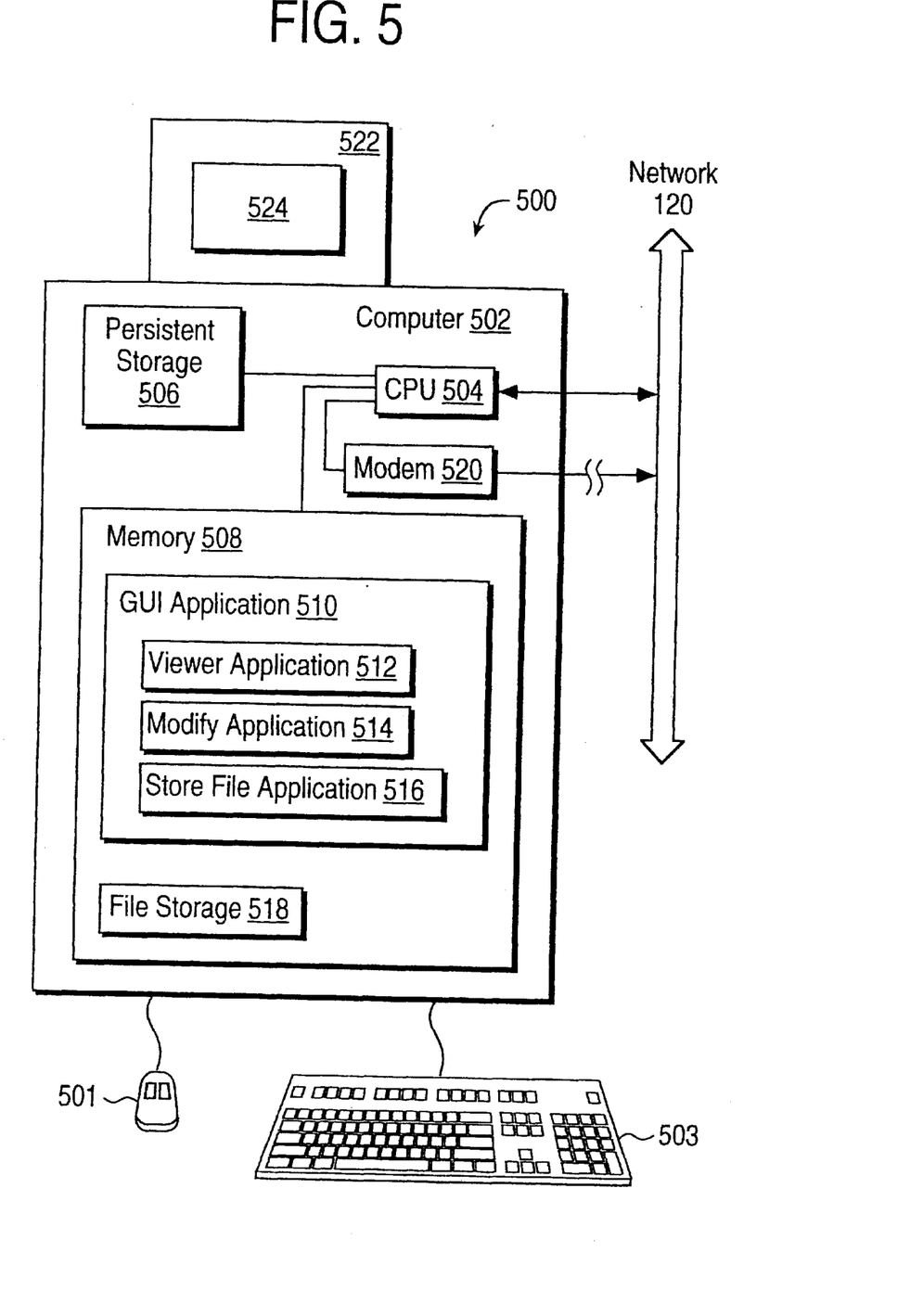
FIG. 5 is a block diagram of a user terminal that may be used as a viewer component of FIG. 1.

FIG. 5 illustrates an embodiment of a user terminal 500 that can be used as a viewer component 130–134, FIG. 1, described above. Such a common configuration can also be used as a file server, a viewer file server or a common server performing all of the server functions as discussed above. Terminal 500 includes computer 502 that includes a central processing unit (CPU) 504 that controls the internal functions of the computer 500 and any connected peripherals including mouse 501 and keyboard 503. Connected to CPU 502 is persistent storage 506 which may store one or more software applications that may be loaded into memory 508 for execution by the CPU. 504. Memory 508, also connected to CPU 504, contains the graphic user interface (GUI) application 510 which allows the user to view files downloaded from the viewer files database 116. The application 510 and the functions that are performed by its viewer file applications 512–518 is computer readable code that is executable by CPU 504.

Included in application 510 is a viewer application 512 that allows a user to read viewer files. Also included is modify application 514 that is configured to mark up a document with banners and other markings as discussed above with FIGS. 3 and 4. The modify application is computer readable code that performs graphic operations to overlay information over document information stored in viewer files. The store application 516 is configured to save marked up versions of viewer files. File storage 518 is an area in storage for storing both viewer files and their modified counterparts. Also included in the user terminal 500 is monitor 522 having viewer screen 524.

The viewer application code 512, modify application code 514 and store file application code 516 can be implemented using methods well known to those skilled in the art. The applications are made up of digital software code that is executable by the CPU 504. When a user sends a command to the file server 124 or viewer server 116, the CPU 504 executes the proper code from the application codes 512–516 to perform the appropriate functions. The respective servers then retrieve the requested documents from the stored files and sends it to the viewer component that requested the document. If the user requests a document that has been converted to a viewer file in viewer database 116, the viewer file is sent to the user immediately. If, however, only the original file exists in the database 117, the viewer server 114 is prompted to convert the original file to a viewer file and send it to the requesting user via network 120. The system could also be configured to allow the requesting user to retrieve the original file from database 117 if desired.

The applications discussed above may be executed by a processor, or a CPU, within the servers discussed above as a series of computer executable instructions. These computer executable instructions may reside in a memory, for example, in RAM, DRAM or SRAM as discussed above. Alternatively, the instructions may be contained on a data storage device with a computer readable medium, such as a computer diskette 600 shown in FIG. 6. The instructions may also be stored on a DASD array, a magnetic tape, a conventional hard disk drive, electronic read-only memory, an optical storage device, or any other appropriate data storage device. In an illustrative embodiment of the invention, the computer readable instructions may be lines of compiled C++ language code.

Figure 6:
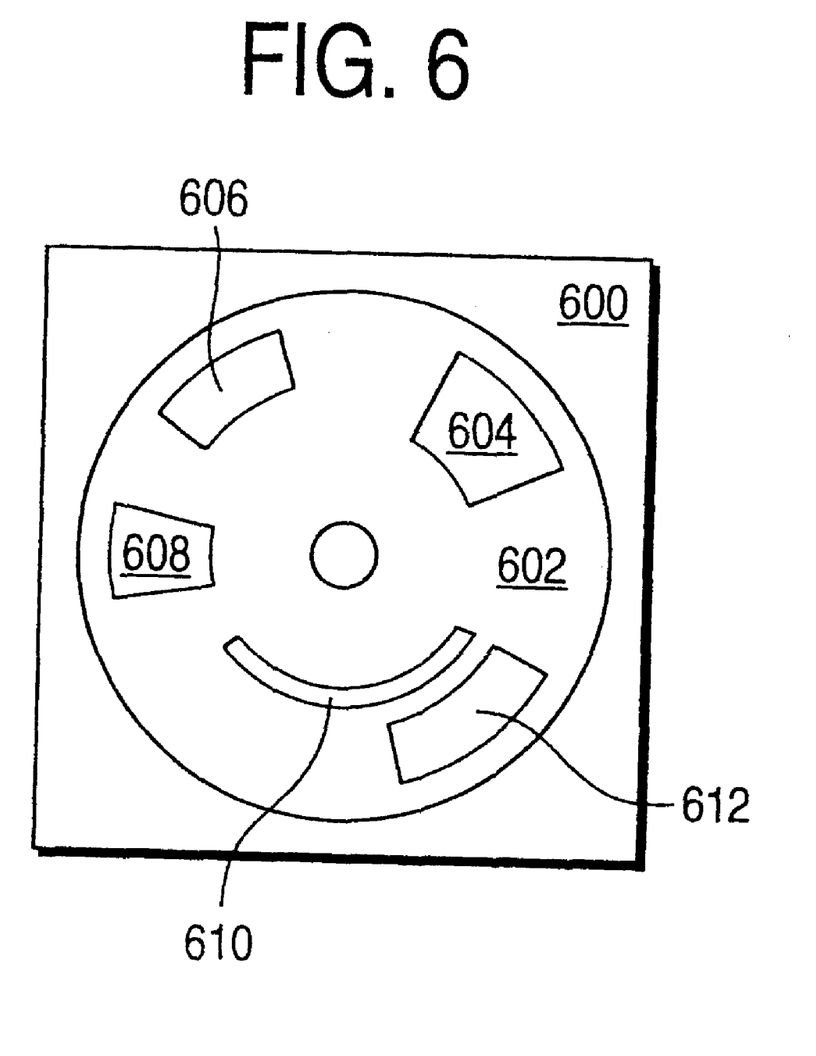
FIG. 6 is an illustration of a computer diskette for storing executable instructions according to the invention.

FIG. 6 illustrates the a preferred structure of such instructions as embodied in a computer program. Those skilled in the art will appreciate that FIG. 6 illustrates preferred structures of the computer program code elements that function according to this invention. Preferably, the invention is practiced in its preferred embodiment by a machine component that renders the computer program code elements in a form that instructs a digital processing apparatus (i.e., a computer) to perform a sequence of functional steps corresponding to those shown in the Figures. The machine component is shown diagramatically in FIG. 6 as a combination of program code elements in computer readable form that are embodied in a computer-usable data medium 602 such as a computer diskette 600. As mentioned above, however, such media may also be found in semiconductor devices, on magnetic tape and on optical disks.

Each of the code elements 604–612 may be program means for directing a digital processing apparatus to facilitate some portion of the method by which this invention is practiced. Even when no single code element 604–612 includes the complete method, two or more of the code elements together may comprise all of the program means necessary to facilitate the practice of the invention.

The invention is directed to a document management system for use in a network computer system that automatically creates and maintains graphical depictions of documents under a universal format and allows convenient viewing and marking of the viewable documents by a user without the need for individual software applications for each format that a particular document may be configured under. Although this embodiment is described and illustrated in the context of a systems having multiple user interfaces connected to a network, the scope of the invention extends to other applications where convenient and efficient document access is required. Furthermore, while the foregoing description has been with reference to particular embodiments of the invention, it will be appreciated that these are only illustrative of the invention and that changes may be made to those embodiments without departing from the principles of the invention, the scope of which is defined by the appended claims.

What is claimed is:

1. A method of managing documents for viewing and marking document files having varying formats without the use of any originating application of a file to view the document stored in the file, comprising:

storing a document file having a format in a storage location that is accessible by a host operating system;

accessing the document file using a software application configured to access the document file;

transferring the document file to a file server;

posting a request to generate an application neutral file format in which to store a viewer file;

performing a print operation on the document file according to the original application file defined by the application under which the document file is configured;

converting the operating system print requests generated by the print application into data records to be stored in a viewer file; and storing the viewer file in a viewer storage location.

2. A method according to claim 1 wherein performing the print operation on the document file further comprises:

interrogating the host operating system with the viewer server to obtain an application for printing the document stored in the file;

launching the application for printing the document obtained from the host operating system;

initiating print operation for the document file by a printer driver in the viewer server;

monitoring the application throughout the print operation with a viewer print monitor in the viewer server; and automatically responding to any user interface requests generated during the print operation to avoid any user intervention.

3. A method according to claim 2, wherein launching of the application is performed using the viewer server.

4. A method according to claim 1, wherein posting a request further comprises transmitting a request signal over a network.

5. A method according to claim 1, wherein interrogating is accomplished by a database maintained by the host operating system.

6. A method according to claim A1, wherein launching includes running a native application program for printing the document.

7. A method according to claim A1, further comprising retrieving a viewer file from the viewer storage location.

8. A document management system for use with a host signal processor and for creating viewable document files from document files having configured under individual and varying native formats to allow viewing of the document files without the use of an original native application, comprising:

a file server configured to manage document files;

a viewer server configured to generate a viewer document file in an application neutral format from an original document file configured in a native document format;

a viewer printer driver configured to initiate a print operation of the original document file configured under a native format by launching a software application that is associated with the original document file;

a viewer print monitor configured to monitor the initiated print operation of the original document file and to automatically respond to user interface requests generated by the software application during the printing operation; and a viewer storage device configured to store the viewer document file in a second document file.

9. A document management system according to claim 8, wherein the application neutral format is a graphics file for containing a graphical representation of a document contained in the original document file.

10. A document management system according to claim 8, wherein the viewer server is configured to automatically launch the native application of an original document file and to initiate a print operation of the original document file by sending a command to the printer driver.

11. A document management system according to claim 8 wherein the viewer print monitor is configured to respond to user interface requests that are sent by the original document's application throughout the print process.

12. A computer program device, comprising:

a computer program storage device readable by a digital processing apparatus;

a program stored on the program storage device and including instructions executable by the digital processing apparatus for controlling the apparatus to perform a method of managing documents for viewing and marking document files having varying formats without the use of any originating application of a file to view the document stored in the file, comprising:

storing a document file having a format in a storage location that is accessible by a host operating system;

accessing the document file using a software application configured to access the document file;

transferring the document file to a file server;

posting a request to generate an application neutral file format under which to configure a viewer file;

performing a print operation on a document file to generate operating system print requests by the print operation;

converting the operating system print requests generated by the print application into data records to be stored in a viewer file; and storing the viewer file in a viewer storage location.

13. A method according to claim 12, wherein performing a print operation on a document file further comprises:

interrogating the host operating system with the viewer server to obtain an application for printing the document stored in the file;

launching the application with the viewer server for printing the document obtained from the host operating system;

initiating print operation for the document file by a printer driver in the viewer server;

monitoring the application throughout the print operation with a viewer print monitor in the viewer server; and automatically responding to any user interface requests generated during the print operation to avoid any user intervention.

14. A computer program product for use with a computer system, a central processing unit and means coupled to the central processing unit for storing a database to automatically manage documents for viewing and marking document files having varying formats without the use of any originating application of a file to view the document stored in the file, comprising:

computer readable code means for storing a document file having a format in a storage location that is accessible by a host operating system;

computer readable code means for accessing the document file using a software application configured to access the document file;

computer readable code means for transferring the document file to a file server;

computer readable code means for performing a print operation on a document file to generate operating system print requests;

computer readable code means for converting the operating system print requests generated by the print operation into data records to be stored in a viewer file; and computer readable code means for storing the viewer file in a viewer storage location.

15. A method according to claim 14, wherein the computer readable code means for performing a print operation on a document file further comprises:

computer readable code means for posting a request by the file server to a viewer server to generate an application neutral file format in which to store a viewer file;

computer readable code means for interrogating the host operating system with the viewer server to obtain an application for printing the document stored in the file;

computer readable code means for launching the application with the viewer server for printing the document obtained from the host operating system;

computer readable code means for initiating print operation for the document file by a printer driver in the viewer server;

computer readable code means for monitoring the application throughout the print operation with a viewer print monitor in the viewer server; and computer readable code means for automatically responding to any user interface requests generated during the print operation to avoid any user intervention.

* * * * *